United States Patent
Koh et al.

(10) Patent No.: US 8,773,544 B2
(45) Date of Patent: Jul. 8, 2014

(54) IMAGE SENSOR AND CAMERA SYSTEM HAVING THE SAME

(75) Inventors: Kyoung-Min Koh, Hwaseong-si (KR); Seog-Heon Ham, Suwon-si (KR); Yong Lim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 275 days.

(21) Appl. No.: 13/311,669

(22) Filed: Dec. 6, 2011

(65) Prior Publication Data
US 2012/0140089 A1  Jun. 7, 2012

(30) Foreign Application Priority Data
Dec. 6, 2010  (KR) .................. 10-2010-0123619

(51) Int. Cl.
*H04N 5/225* (2006.01)
*H04N 3/14* (2006.01)
*H03M 1/56* (2006.01)

(52) U.S. Cl.
USPC .................. 348/220.1; 348/308; 341/169

(58) Field of Classification Search
USPC ............... 348/220.1, 241, 308; 341/122, 126, 341/155, 169, 170, 172
See application file for complete search history.

(56) References Cited

U.S. PATENT DOCUMENTS

| | | | |
|---|---|---|---|
| 6,633,335 B1* | 10/2003 | Kwon et al. | 348/308 |
| 7,345,613 B2 | 3/2008 | Higuchi | |
| 7,642,947 B2* | 1/2010 | Suzuki et al. | 341/169 |
| 7,750,836 B2* | 7/2010 | Muramatsu et al. | 341/169 |
| 7,973,695 B2* | 7/2011 | Kudo | 341/169 |
| 8,330,635 B2* | 12/2012 | Hisamatsu | 341/155 |
| 8,334,913 B2* | 12/2012 | Sakurai et al. | 348/241 |
| 8,395,539 B2* | 3/2013 | Lim et al. | 341/169 |
| 2005/0280730 A1* | 12/2005 | Lim et al. | 348/308 |
| 2010/0033362 A1* | 2/2010 | Kitami | 341/169 |
| 2011/0074994 A1 | 3/2011 | Wakabayashi et al. | |
| 2011/0141324 A1* | 6/2011 | Koseki | 348/241 |
| 2011/0205100 A1* | 8/2011 | Bogaerts | 341/169 |
| 2013/0141266 A1* | 6/2013 | Kuramochi | 341/144 |

FOREIGN PATENT DOCUMENTS

JP  2009-296423 A  12/2009
KR  10-0913797 B1  8/2009

* cited by examiner

*Primary Examiner* — Timothy J Henn
(74) *Attorney, Agent, or Firm* — Sughrue Mion, PLLC

(57) ABSTRACT

An image sensor includes a reference voltage generation unit that generates a reference voltage that alternately decreases and increases at a constant rate in an operation mode of the image sensor to convert analog signals of detected incident light to a digital value using the reference voltage to determine an intensity of the incident light with high sensitivity and high signal-to-noise ratio.

16 Claims, 12 Drawing Sheets

IMAGE SENSOR AND CAMERA SYSTEM HAVING THE SAME

CROSS-REFERENCE TO RELATED APPLICATION

This application claims priority from Korean Patent Application No. 10-2010-0123619, filed on Dec. 6, 2010 in the Korean Intellectual Property Office (KIPO), the contents of which are herein incorporated by reference in their entirety.

BACKGROUND

1. Technical Field

Exemplary embodiments relate to an image sensor, and more particularly to an image sensor having high sensitivity and high signal to noise ratio (SNR) without degrading frame rate, and a camera system including the image sensor.

2. Description of the Related Art

Camera systems require a high speed operation in a video recording mode compared to a still image capturing mode. Therefore, an exposure time of camera systems in a video recording mode is shorter than an exposure time of camera systems in a still image capturing mode. For this reason, a high sensitivity image sensor that is able to sufficiently detect incident light during a short exposure time is required for a video recording.

Usually, digital still cameras use a relatively low sensitivity image sensor as compared to camcorders, which are mainly used for video recording. Therefore, a quality of a video image generated by digital still cameras in a video recording mode is relatively low.

SUMMARY

Exemplary embodiments are directed to providing an image sensor having high sensitivity and high signal to noise ratio (SNR) without degrading frame rate.

Exemplary embodiments are also directed to providing a camera system that includes the image sensor having high sensitivity and high signal to noise ratio (SNR) without degrading frame rate.

According to an aspect of the exemplary embodiments, an image sensor includes a pixel array, a reference voltage generation unit, an analog-digital conversion unit, and a control unit. The pixel array includes a plurality of pixels arranged columns and rows, where each of the pixels detects incident light and generates an analog signal in response to the detected incident light. The reference voltage generation unit generates a reference voltage that changes at a constant rate in a first operation mode and alternately decreases and increases at the constant rate in a second operation mode. The analog-digital conversion unit converts the analog signal to a digital value a first number of times using the reference voltage and generates a digital signal by summing the first number of the digital values, where the first number corresponds to a total number of decrease and increase of the reference voltage and the analog-digital conversion unit operates at a same speed both in the first operation mode and in the second operation mode to generate the digital signal. The control unit controls operations of the pixel array, the reference voltage generation unit, and the analog-digital conversion unit.

In the exemplary embodiments, the first operation mode may be a still image capturing mode and the second operation mode may be a video recording mode.

In the exemplary embodiments, the reference voltage generation unit may receive a mode signal, a gain signal, and a count enable signal from the control unit, generate the reference voltage that decreases at the constant rate during an active period, in which the count enable signal is enabled, when the mode signal is at a first level corresponding to the first operation mode, and generate the reference voltage that alternately decreases and increases at the constant rate in a cycle of a sub period, which is a portion of the active period divided by a value of the gain signal, when the mode signal is at a second level corresponding to the second operation mode.

In the exemplary embodiments, the reference voltage generation unit may include a resistor connected to a supply voltage and a current generation unit coupled between the resistor and a ground voltage, where the current generation unit receives a mode signal, a gain signal, and a count enable signal from the control unit, generates a reference current that increases at the constant rate during an active period, in which the count enable signal is enabled, when the mode signal is at a first level corresponding to the first operation mode, and generates the reference current that alternately increases and decreases at the constant rate in a cycle of a sub period, which divides the active period with a value of the gain signal, when the mode signal is at a second level corresponding to the second operation mode. The reference current may flow from the resistor to the ground voltage. The reference voltage generation unit may output the reference voltage from a node at which the resistor and the current generation unit is coupled.

In the exemplary embodiments, each of the pixels may consecutively generate a first analog signal corresponding to a reset component and a second analog signal corresponding to the detected incident light, and the analog-digital conversion unit may generate the digital signal corresponding to an effective intensity of incident light among the detected incident light by performing a correlated double sampling (CDS) operation on the first analog signal and the second analog signal.

The analog-digital conversion unit may include a plurality of comparators, each of which is connected to a corresponding column of the pixel array and generates a comparison signal by comparing the first analog signal with the reference voltage and comparing the second analog signal with the reference voltage, and a plurality of counters, each of which is connected to a corresponding comparator and receives the comparison signal from the corresponding comparator, where each of the counters receives a count clock signal and an up-down control signal from the control unit and generates the digital signal by performing one of a down-counting and an up-counting in response to the up-down control signal in synchronization with the count clock signal while the comparison signal is enabled.

The control unit may provide the plurality of the counters with the count clock signal having a same frequency in the first operation mode and in the second operation mode.

Each of the counters may generate a first counting value by accumulatively performing the down-counting the first number of times from zero when each of the counters receives the first analog signal from the pixel array, and generate a second counting value by accumulatively performing the up-counting the first number of times from the first counting value when each of the counters receives the second analog signal from the pixel array, where each of the counters outputs the second counting value as the digital signal.

The analog-digital conversion unit may perform a binning operation on neighboring pixels of a same color in the second operation mode.

The analog-digital conversion unit may perform a two-by-two (2*2) binning operation on four neighboring pixels of the same color that are adjacent in a column direction and in a row direction of each other in the second operation mode.

The control unit may consecutively select rows, which are included in the pixel array, having pixels on which the binning operation is performed in the second operation mode.

Each of the counters may accumulatively perform the down-counting and the up-counting for the rows having pixels on which the binning operation is performed in the second operation mode.

The analog-digital conversion unit may further include a plurality of adders, each of which generates a binning digital signal by summing the digital signals generated by counters which correspond to pixels on which binning operation is performed in the second operation mode.

The control unit may include a column driver that consecutively outputs the digital signals received from the plurality of the counters in the first operation mode and consecutively outputs the binning digital signals received from the plurality of the adders in the second operation mode.

According to an aspect of the exemplary embodiments, a camera system includes an image sensor, a storage unit, and a processor. The image sensor generates a digital signal corresponding to incident light. The storage unit stores the digital signal. The processor controls operations of the image sensor and the storage unit. The image sensor includes a pixel array, a reference voltage generation unit, an analog-digital conversion unit, and a control unit. The pixel array includes a plurality of pixels arranged columns and rows, where each of the pixels detects incident light and generates an analog signal in response to the detected incident light. The reference voltage generation unit generates a reference voltage that consistently changes at a constant rate in a first operation mode and generates the reference voltage that alternately decreases and increases at the constant rate in a second operation mode. The analog-digital conversion unit converts the analog signal to a digital value a first number of times using the reference voltage and generates the digital signal by summing the first number of the digital values, where the first number corresponds to a total number of decrease and increase of the reference voltage and the analog-digital conversion unit operates in a same speed both in the first operation mode and in the second operation mode to generate the digital signal. The control unit controls operations of the pixel array, the reference voltage generation unit, and the analog-digital conversion unit.

BRIEF DESCRIPTION OF THE DRAWINGS

Illustrative, non-limiting exemplary embodiments will be more clearly understood from the following detailed description in conjunction with the accompanying drawings, wherein.

DETAILED DESCRIPTION OF THE EXEMPLARY EMBODIMENTS

Figure 1:
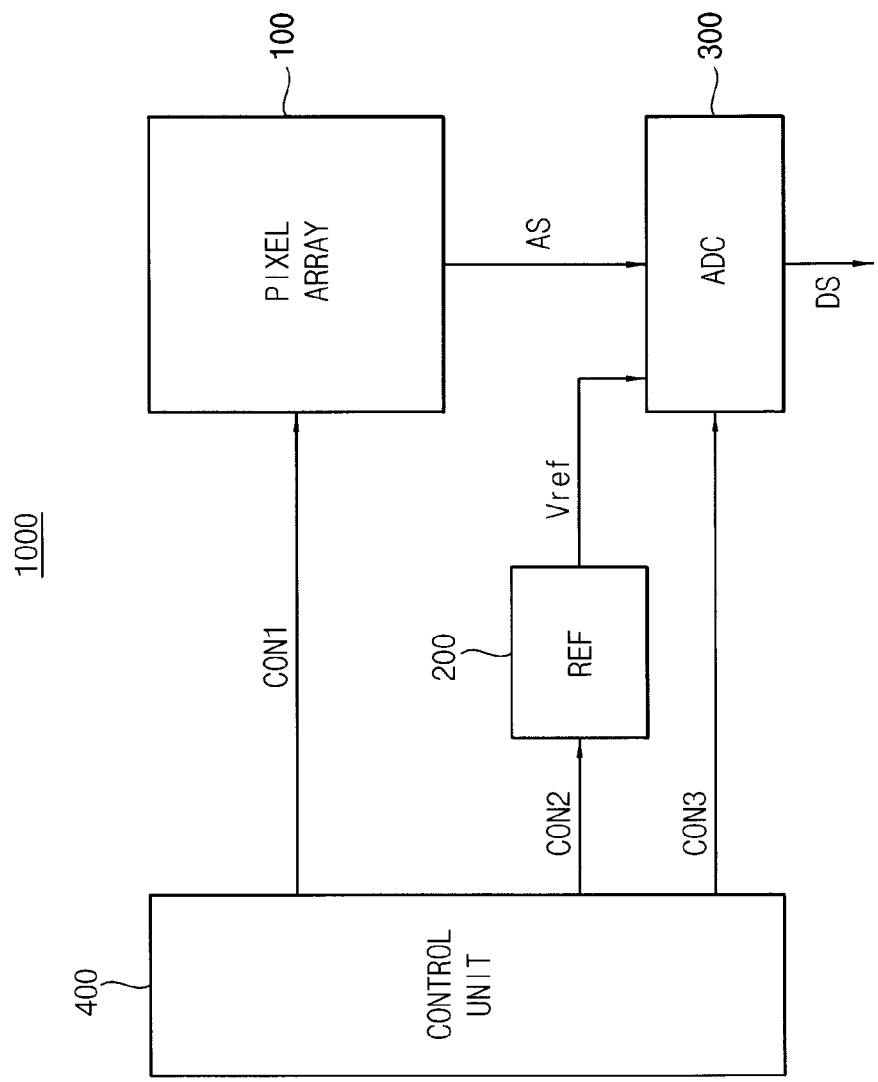
FIG. 1 is a block diagram illustrating an image sensor according to an exemplary embodiment.

Various exemplary embodiments will be described more fully with reference to the accompanying drawings, in which some example embodiments are shown. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another element. For example, a first element could be termed a second element, and, similarly, a second element could be termed a first element, without departing from the scope of the disclosure. As used herein, the term "and/or" includes any and all combinations of one or more of the associated listed items.

It will be understood that when an element is referred to as being "connected" or "coupled" to another element, the referred element can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image sensor according to an exemplary embodiment.

Referring to FIG. 1, an image sensor 1000 includes a pixel array 100, a reference voltage generation unit REF 200, an analog-digital conversion unit ADC 300, and a control unit 400.

The pixel array 100 includes a plurality of pixels arranged columns and rows. Each of the pixels detects incident light and generates an analog signal AS in response to the detected incident light.

The reference voltage generation unit 200 generates a reference voltage Vref that changes at a constant rate in a first operation mode, and generates the reference voltage Vref that alternately decreases and increases at the constant rate in a second operation mode.

The analog-digital conversion unit 300 converts the analog signal AS to a digital value a first number of times using the reference voltage Vref and generates a digital signal DS by summing the first number of the digital values. The first number corresponds to a total number of decrease and increase of the reference voltage Vref. For example, since the reference voltage Vref consistently decreases or increases in the first operation mode, the analog-digital conversion unit 300 may convert the analog signal AS to a digital value one time and output the digital value as the digital signal DS. Since the reference voltage Vref alternately decreases and increases in the second operation mode, the analog-digital conversion unit 300 may convert the analog signal AS to a digital value the first number of times, which corresponds to a total number of decrease and increase of the reference voltage Vref, and generate the digital signal DS by summing the generated digital values.

The analog-digital conversion unit 300 operates in a same speed both in the first operation mode and in the second operation mode to generate the digital signal DS. For example, a time required for the analog-digital conversion unit 300 to generate the digital signals DS from the analog signals AS corresponding to a row of the pixel array 100 may be the same between in the first operation mode and in the second operation mode. Therefore, a time required for the analog-digital conversion unit 300 to generate the digital signals DS from the analog signals AS corresponding to a frame may be the same in the first operation mode and in the second operation mode.

The control unit 400 controls an operation of the pixel array 100 using a first control signal CON1, controls an operation of the reference voltage generation unit 200 using a second control signal CON2, and controls an operation of the analog-digital conversion unit 300 using a third control signal CON3.

The first operation mode may be a still image capturing mode and the second operation mode may be a video recording mode. An exposure time, during which each of the pixels included in the pixel array 100 detects an incident light, in the second operation mode may be shorter than an exposure time in the first operation mode, so that a magnitude of the analog signal AS generated in the second operation mode may be smaller than a magnitude of the analog signal AS generated in the first operation mode for the same incident light.

Figure 2:
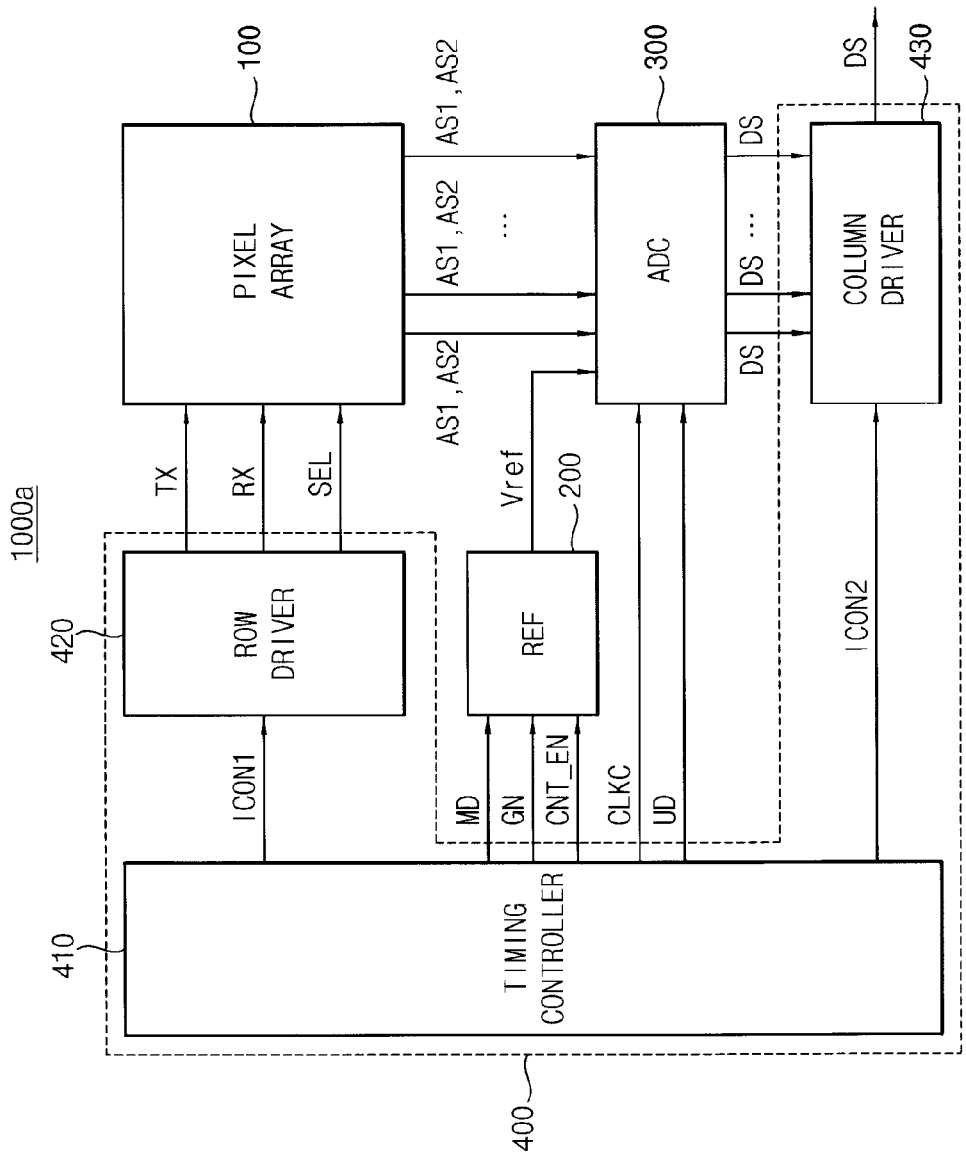
FIG. 2 is a block diagram illustrating an example of an image sensor of FIG. 1.

FIG. 2 is a block diagram illustrating an example of an image sensor of FIG. 1.

Referring to FIG. 2, an image sensor 1000a may include a pixel array 100, a reference voltage generation unit REF 200, an analog-digital conversion unit ADC 300, and a control unit 400. The control unit 400 may include a timing controller 410, a row driver 420, and a column driver 430.

The timing controller 410 may provide a first inner control signal ICON1 to the row driver 420, and the row driver 420 may control an operation of the pixel array 100 in a unit of a row in response to the first inner control signal ICON1. For example, the row driver 420 may control the operation of the pixel array 100 in a unit of a row by providing a row selection signal SEL, a reset control signal RX, and a transmission control signal TX to the pixel array 100.

Each of the pixels included in the pixel array 100 may consecutively generate a first analog signal AS1 corresponding to a reset component and a second analog signal AS2 corresponding to the detected incident light in response to the row selection signal SEL, the reset control signal RX, and the transmission control signal TX received from the row driver 420.

Figure 3:
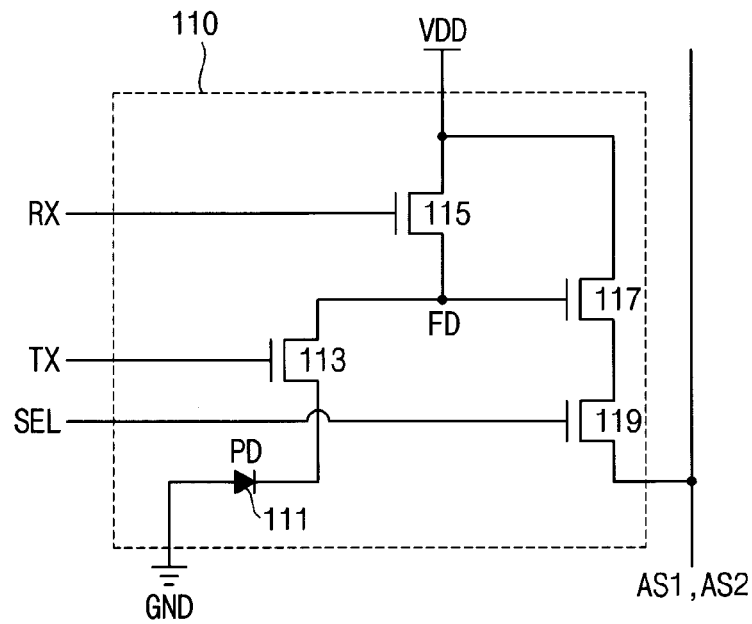
FIG. 3 is a circuit diagram illustrating an example of a unit pixel included in a pixel array of FIG. 2.

FIG. 3 is a circuit diagram illustrating an example of a unit pixel included in a pixel array of FIG. 2.

Referring to FIG. 3, a unit pixel 110 may include a photo diode PD 111, a transmission transistor 113, a reset transistor 115, a sensing transistor 117, and a row selection transistor 119.

Hereinafter, an operation of the pixel array 100 will be described with reference to FIGS. 2 and 3.

The row driver 420 may select one of rows included in the pixel array 100 by providing an activated row selection signal SEL to the selected row of the pixel array 100 to turn on the row selection transistor 119. The row driver 420 may provide an activated reset control signal RX to the selected row to turn on the reset transistor 115. Therefore, a voltage of a node FD may be a supply voltage VDD, so that the sensing transistor 117 may be turned on to output the first analog signal AS1 corresponding to the voltage of the node FD.

After that, the row driver 420 may deactivate the reset control signal RX. When light is incident on the photo diode 111, the photo diode 111 may generate electron-hole pairs (EHPs). The generated EHPs may be accumulated at a source node of the transmission transistor 113 so that a potential of the source node of the transmission transistor 113 may be changed. The row driver 420 may provide an activated transmission control signal TX to the transmission transistor 113 to turn on the transmission transistor 113, and then the accumulated EHPs may be transferred to the node FD. The voltage of the node FD, which is a voltage of a gate of the sensing transistor 117, may be changed in response to the number of EHPs transferred to the node FD. If the row selection transistor 119 is turned on, the second analog signal AS2 corresponding to the voltage of the node FD may be outputted from the unit pixel 110.

The row driver 420 may activate the reset control signal RX again to turn on the reset transistor 115 so that the voltage of the node FD may be the supply voltage VDD.

The pixel array 100 may repeat above described operations to generate the first analog signal AS1 and the second analog signal AS2 row by row.

The first analog signal AS1 and the second analog signal AS2 outputted from the pixel array 100 have variations in a reset component for each pixel due to respective characteristic of each pixel referred to as a fixed pattern noise (FPN) and respective characteristic of each logic circuit for outputting a voltage signal from a corresponding pixel. Accordingly, an effective intensity of incident light needs to be abstracted by subtracting the respective reset component from the detected intensity of incident light.

For this reason, each pixel included in the pixel array 100 may generate the first analog signal AS1 corresponding to a respective reset component, and detect the intensity of incident light to generate the second analog signal AS2 corresponding to a respective detected intensity of incident light. And then, the analog-digital conversion unit 300 may generate the digital signal DS corresponding to an effective intensity of incident light among the detected incident light by performing a correlated double sampling (CDS) operation on the first analog signal AS1 and the second analog signal AS2. In this application, a CDS operation represents converting two analog signals into two digital signals, respectively, and then outputting a difference between the two digital signals.

Referring again to FIG. 2, the timing controller 410 may control the operation of the reference voltage generation unit 200 by providing a mode signal MD, a gain signal GN, and a count enable signal CNT_EN to the reference voltage generation unit 200.

The reference voltage generation unit 200 may determine an operation mode in response to the mode signal MD. For example, the reference voltage generation unit 200 may operate in the first operation mode when the mode signal MD is at a first level, and the reference voltage generation unit 200 may operate in the second operation mode when the mode signal MD is at a second level. The reference voltage generation unit 200 may generate the reference voltage Vref that decreases at the constant rate during an active period, in which the count enable signal CNT_EN is enabled, when the mode signal MD is at the first level. The reference voltage generation unit 200 may generate the reference voltage Vref that alternately decreases and increases at the same constant rate in a cycle of a sub period, which divides the active period with a value of the gain signal GN, when the mode signal MD is at the second level.

Figure 4:
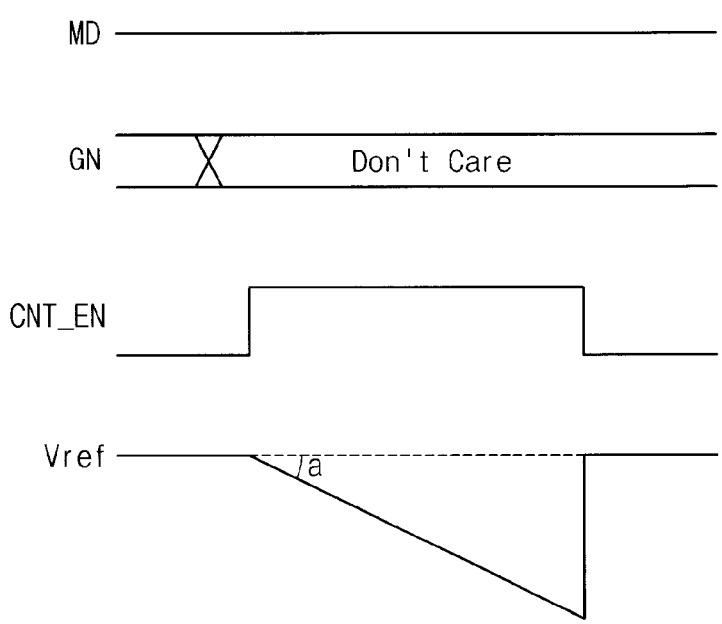
FIG. 4 is a timing diagram for describing an operation of a reference voltage generation unit of FIG. 2 in a first operation mode.
Figure 5:
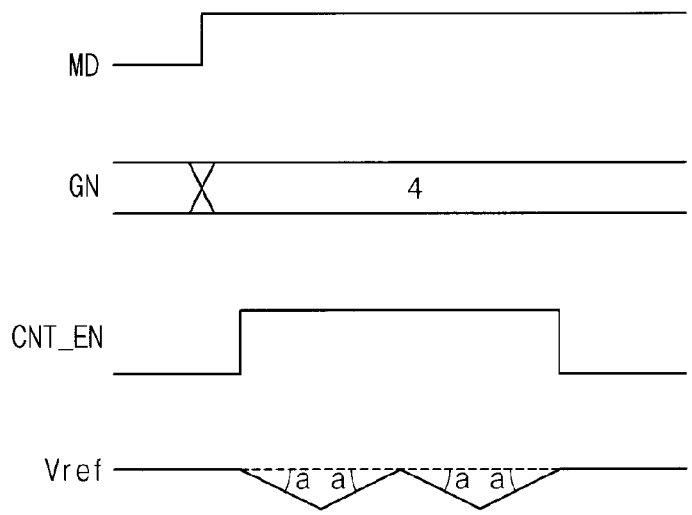
FIG. 5 is a timing diagram for describing an operation of a reference voltage generation unit of FIG. 2 in a second operation mode.

FIG. 4 is a timing diagram for describing an operation of a reference voltage generation unit of FIG. 2 in a first operation mode, and FIG. 5 is a timing diagram for describing an operation of a reference voltage generation unit of FIG. 2 in a second operation mode.

In FIG. 5, the value of the gain signal GN is four. In FIGS. 4 and 5, the first level is a logic low level and the second level is a logic high level.

Referring to FIG. 4, the reference voltage generation unit 200 may generate the reference voltage Vref that decreases at the constant rate, that is a slope of 'a', during the active period, in which the count enable signal CNT_EN is enabled, when the mode signal MD is at a logic low level.

Referring to FIG. 5, the reference voltage generation unit 200 may generate the reference voltage Vref that alternately decreases and increases at the same constant rate as in FIG. 4, that is the slope of 'a', in a cycle of the sub period, which divides the active period with a value of the gain signal GN, that is four in FIG. 5, when the mode signal MD is at a logic high level. For example, since the value of the gain signal GN is four, the active period is divided into four sub periods, in which the reference voltage Vref may decrease at the rate of the slope of 'a' during a first sub period of the active period, increase at the rate of the slope of 'a' during a second sub period of the active period, decrease at the rate of the slope of 'a' during a third sub period of the active period, and increase at the rate of the slope of 'a' during a fourth sub period of the active period.

The length of the active period may be the same in the first operation mode and in the second operation mode. The value of the gain signal GN may be a positive integer other than four.

As illustrated in FIGS. 4 and 5, a minimum of the reference voltage Vref in the second operation mode may be larger than a minimum of the reference voltage Vref in the first operation mode since the reference voltage generation unit 200 consistently decreases the reference voltage Vref at the constant rate during the active period in the first operation mode while the reference voltage generation unit 200 alternately decreases and increases at the same constant rate during the same active period in the second operation mode.

Figure 6:
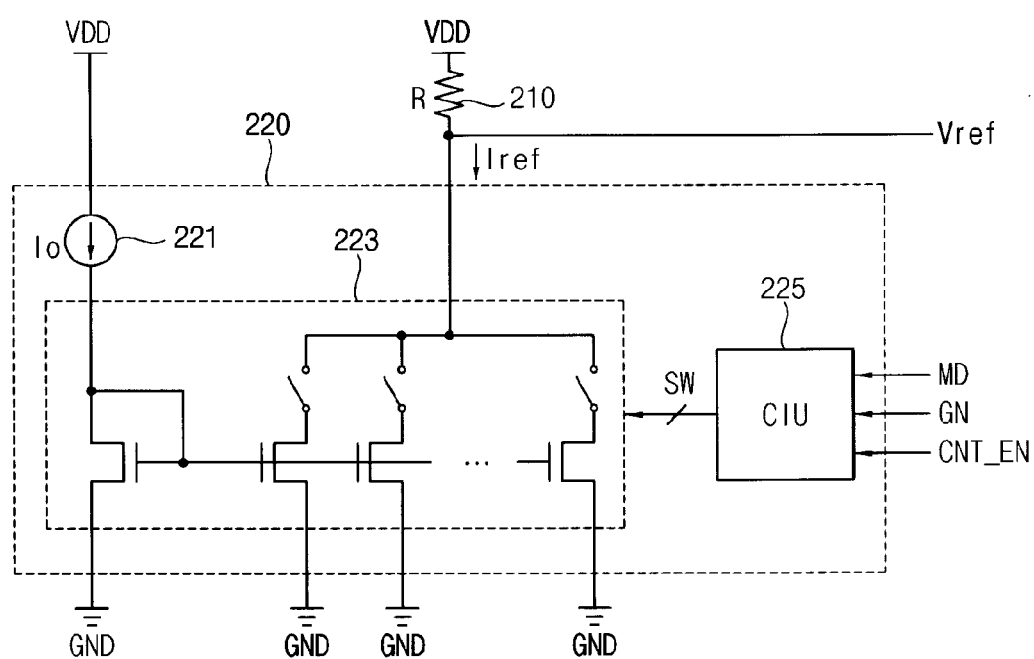
FIG. 6 is a block diagram illustrating an example of a reference voltage generation unit of FIG. 2.

FIG. 6 is a block diagram illustrating an example of a reference voltage generation unit of FIG. 2.

Referring to FIG. 6, a reference voltage generation unit 200a may include a resistor R 210 and a current generation unit 220.

The resistor 210 may be coupled between the supply voltage VDD and the current generation unit 220.

The current generation unit 220 may be coupled between the resistor 210 and a ground voltage GND. The current generation unit 220 may receive the mode signal MD, the gain signal GN, and the count enable signal CNT_EN from the control unit 400. The current generation unit 220 may generate a reference current Iref that increases at a constant rate during the active period, in which the count enable signal CNT_EN is enabled, when the mode signal MD is at the first level. The current generation unit 220 may generate the reference current Iref that alternately increases and decreases at the same constant rate in a cycle of the sub period, which divides the active period with the value of the gain signal GN, when the mode signal MD is at the second level. The reference current Iref may flow from the resistor 210 to the ground voltage GND.

The current generation unit 220 may include a static current source 221, a current amplification unit 223, and a current control unit CIU 225.

The static current source 221 may generate a static current Io having a constant magnitude.

The current control unit 225 may generate the amplification control signal SW in response to receiving the mode signal MD, the gain signal GN, and the count enable signal CNT_EN from the control unit 400.

The current amplification unit 223 may amplify the static current Io to generate the reference current Iref in response to an amplification control signal SW received from the current control unit CIU 225. As illustrated in FIG. 6, the current amplification unit 223 may include a plurality of current mirrors, each of which has an n-type metal oxide semiconductor (NMOS) and a switch connected in serial. Each switch included in each of the current mirrors may be controlled by the amplification control signal SW so that a magnitude of the reference current Iref may be adjusted.

The reference voltage generation unit 200a may output the reference voltage Vref from a node at which the resistor 210 and the current generation unit 220 is coupled. The reference voltage Vref having a maximum value may be generated when all switches included in the current mirrors are opened. The reference voltage Vref may be decreased in a constant rate by consecutively closing the switches one by one, and may be increased in the constant rate by consecutively opening the switches one by one.

Referring again to FIG. 2, the analog-digital conversion unit 300 may generate the digital signal DS corresponding to an effective intensity of incident light among the detected incident light by performing a CDS operation on the first analog signal AS1 and the second analog signal AS2 received from the pixel array 100.

Figure 7:
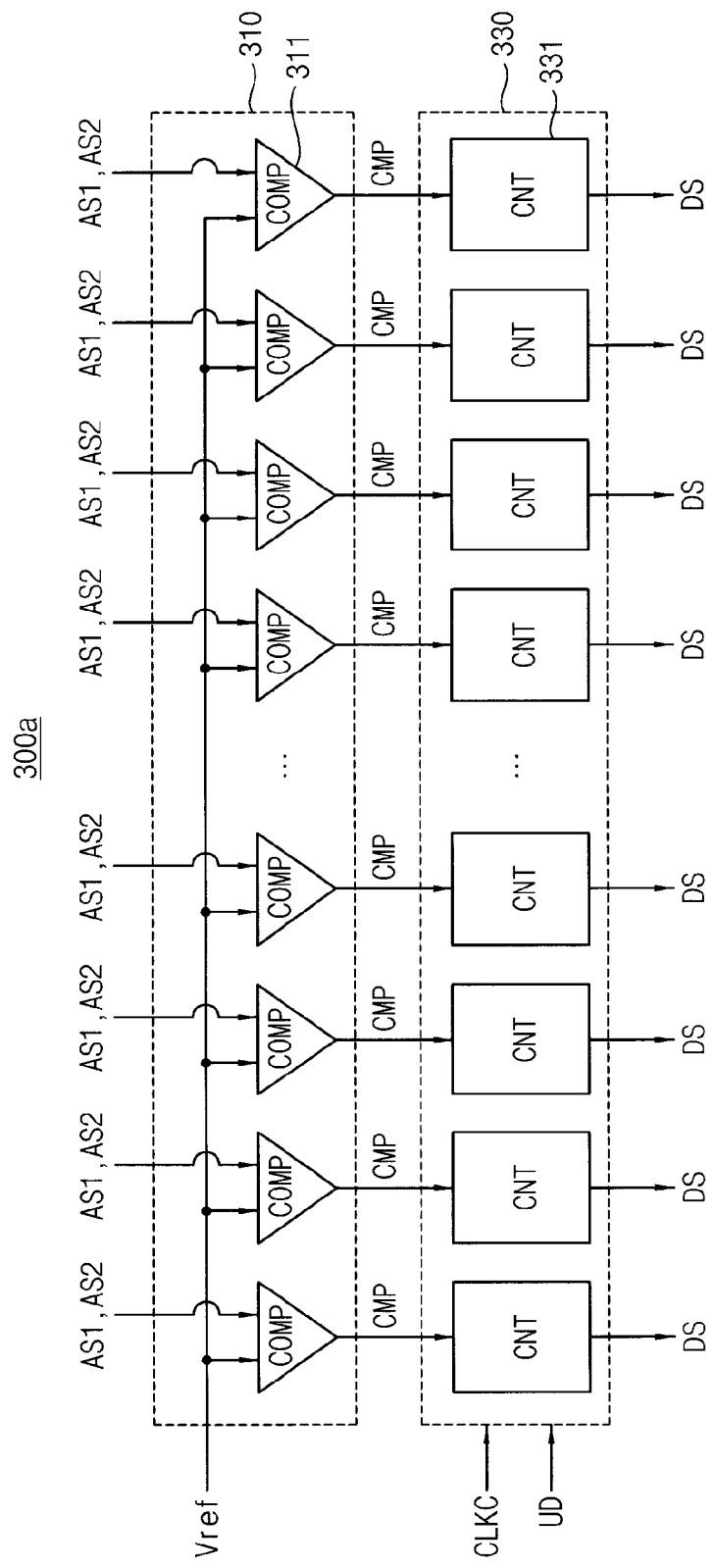
FIG. 7 is a block diagram illustrating an example of an analog-digital conversion unit of FIG. 2.

FIG. 7 is a block diagram illustrating an example of an analog-digital conversion unit of FIG. 2

Referring to FIG. 7, an analog-digital conversion unit 300a may include a comparison unit 310 and a count unit 330.

The comparison unit 310 may include a plurality of comparators COMP 311, each of which is connected to a corresponding column of the pixel array 100. Each of the comparators 311 may compare the first analog signal AS1 with the reference voltage Vref and comparing the second analog signal AS2 with the reference voltage Vref and generate a comparison signal CMP that indicates a result of the comparing. For example, when each of the comparators 311 receives the first analog signal AS1 from the pixel array 100, each of the comparators 311 may compare the first analog signal AS1 with the reference voltage Vref, enable the comparison signal CMP if the first analog signal AS1 is smaller than the reference voltage Vref and disable the comparison signal CMP if the first analog signal AS1 is larger than the reference voltage Vref. Alternatively, when each of the comparators 311 receives the second analog signal AS2 from the pixel array 100, each of the comparators 311 may compare the second analog signal AS2 with the reference voltage Vref, enable the comparison signal CMP if the second analog signal AS2 is smaller than the reference voltage Vref and disable the comparison signal CMP if the second analog signal AS2 is larger than the reference voltage Vref. The comparison signal CMP may be enabled at a logic high level and disabled at a logic low level.

The count unit 330 may include a plurality of counters CNT 331, each of which is connected to a corresponding comparator 311 and receives the comparison signal CMP from the corresponding comparator 311. Each of the counters 331 may receive a count clock signal CLKC and an up-down control signal UD from the timing controller 410 included in the control unit 400 and generate the digital signal DS by performing one of a down-counting and an up-counting in response to the up-down control signal UD in synchronization with the count clock signal CLKC while the comparison signal CMP is enabled. The count clock signal CLKC may be toggled only during the active period in which the count enable signal CNT_EN is enabled.

The timing controller 410 may provide the counters 331 with the count clock signal CLKC having a same frequency in both the first operation mode and in the second operation mode. Therefore, each of the counters 331 may perform the down-counting and the up-counting at a same speed in both the first operation mode and in the second operation mode.

For example, each of the counters 331 may perform a down-counting when the up-down control signal UD is at a first logic level and perform an up-counting when the up-down control signal UD is at a second logic level. The timing controller 410 may control each of the counters 331 to perform a down-counting by providing the up-down control signal UD having the first logic level to each of the counters 331 when the pixel array 100 generates the first analog signal AS1, and control each of the counters 331 to perform an up-counting by providing the up-down control signal UD having the second logic level to each of the counters 331 when the pixel array 100 generates the second analog signal AS2. The first logic level may be a logic high level and the second logic level may be a logic low level.

Each of the counters 331 may generate a first counting value by accumulatively performing the down-counting the first number of times, which corresponds to a total number of decrease and increase of the reference voltage Vref, from zero when each of the counters 331 receives the first analog signal AS1 from the pixel array 100, that is, when the up-down control signal UD is at the first logic level, and generate a second counting value by accumulatively performing the up-counting the first number of times from the first counting value when each of the counters 331 receives the second analog signal AS2 from the pixel array 100, that is, when the up-down control signal UD is at the second logic level. Each of the counters 331 may output the second counting value as the digital signal DS.

For example, since the reference voltage Vref consistently decreases in the first operation mode, each of the counters 331 may generate the first counting value by performing the down-counting one time from zero in synchronization with the count clock signal CLKC during the active period, in which the count enable signal CNT_EN is enabled, when the up-down control signal UD is at the first logic level, generate the second counting value by performing the up-counting one time from the first counting value in synchronization with the count clock signal CLKC during the active period when the up-down control signal UD is at the second logic level, and output the second counting value as the digital signal DS. Similarly, since the reference voltage Vref alternately decreases and increases in the second operation mode, each of the counters 331 may generate the first counting value by accumulatively performing the down-counting the first number of times, which corresponds to a total number of decrease and increase of the reference voltage Vref, from zero in synchronization with the count clock signal CLKC during the active period when the up-down control signal UD is at the first logic level, generate the second counting value by accumulatively performing the up-counting the first number of times, which corresponds to a total number of decrease and increase of the reference voltage Vref, from the first counting value in synchronization with the count clock signal CLKC during the active period when the up-down control signal UD is at the second logic level, and output the second counting value as the digital signal DS.

Referring again to FIG. 2, the column driver 430 may consecutively output the digital signals DS corresponding to a row of the pixel array 100 received from the analog-digital conversion unit 300 in response to a second inner control signal ICON2 received from the timing controller 410. Although not illustrated in FIG. 2, the column driver 430 may provide the digital signals DS to a digital signal processor.

Figure 8:
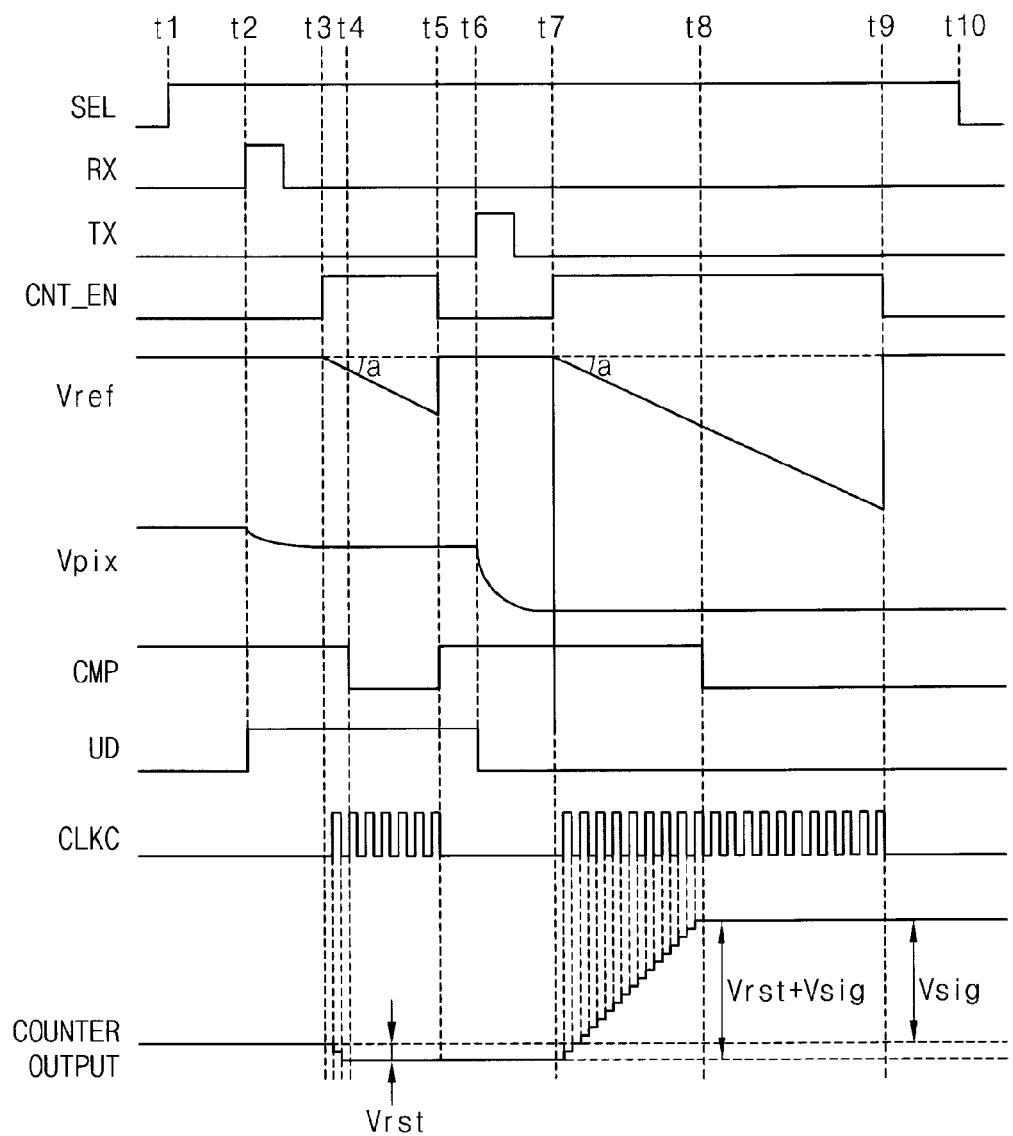
FIG. 8 is a timing diagram for describing an operation of an image sensor of FIG. 2 in a first operation mode.

FIG. 8 is a timing diagram for describing an operation of an image sensor of FIG. 2 in a first operation mode. In FIG. 8, an operation of the image sensor 1000a for one column of the pixel array 100 is illustrated. In FIG. 8, a pixel voltage Vpix is a signal that is outputted from the pixel array 100.

At a time t1, the row driver 420 may select one of rows included in the pixel array 100 by providing an activated row selection signal SEL to the selected row of the pixel array 100.

At a time t2, the row driver 420 may provide an activated reset control signal RX to the selected row, and the timing controller 410 may provide the up-down control signal UD having a logic high level to the counter 331. From the time t2, the pixel array 100 may output the first analog signal AS1 corresponding to a reset component Vrst as the pixel voltage Vpix.

At a time t3, the timing controller 410 may provide the count enable signal CNT_EN having a logic high level to the reference voltage generation unit 200, and the reference voltage generation unit 200 may start to decrease the reference voltage Vref at the constant rate, that is a slope of 'a'. The comparator 311 may provide the comparison signal CMP having a logic high level to the counter 331 since the pixel voltage Vpix is smaller than the reference voltage Vref. The timing controller 410 may provide the count clock signal CLKC to the counter 331, and the counter 331 may perform the down-counting from zero in synchronization with the count clock signal CLKC.

At a time t4, a magnitude of the reference voltage Vref may become smaller than a magnitude of the pixel voltage Vpix, and the comparator 311 may provide the comparison signal CMP having a logic low level to the counter 331 so that the counter 331 stops performing the down-counting. At the time t4, a counter output of the counter 331 may be the first counting value that corresponds to the reset component Vrst. In an example of FIG. 8, the counter output of the counter 331 at the time t4 may be −2.

At a time t5, the timing controller 410 may provide the count enable signal CNT_EN having a logic low level to the reference voltage generation unit 200, and the reference voltage generation unit 200 may stop generating the reference voltage Vref.

A period from the time t3 to the time t5 corresponds to a maximum time for detecting the reset component Vrst. A length of the period from the time t3 to the time t5 may be determined as a certain number of the count clock signal CLKC according to a characteristic of the image sensor 1000a.

At a time t6, the row driver 420 may provide an activated transmission control signal TX to the selected row, and the timing controller 410 may provide the up-down control signal UD having a logic low level to the counter 331. From the time t6, the pixel array 100 may output the second analog signal AS2 corresponding to a detected incident light Vrst+Vsig as the pixel voltage Vpix.

At a time t7, the timing controller 410 may provide the count enable signal CNT_EN having a logic high level to the reference voltage generation unit 200, and the reference voltage generation unit 200 may start to decrease the reference voltage Vref at the same constant rate as at the time t3, that is a slope of 'a'. The comparator 311 may provide the comparison signal CMP having a logic high level to the counter 331 since the pixel voltage Vpix is smaller than the reference voltage Vref. The timing controller 410 may provide the count clock signal CLKC to the counter 331, and the counter 331 may perform the up-counting from the first counting value, which corresponds to the reset component Vrst, in synchronization with the count clock signal CLKC.

At a time t8, the magnitude of the reference voltage Vref may become smaller than the magnitude of the pixel voltage Vpix, and the comparator 311 may provide the comparison signal CMP having a logic low level to the counter 331 so that the counter 331 stops performing the up-counting. At the time t8, the counter output of the counter 331 may correspond to a difference between the first analog signal AS1 representing the reset component Vrst (that is, −2 in the example of FIG. 8) and the second analog signal AS2 representing the detected incident light Vrst+Vsig (that is, 17 in the example of FIG. 8). The difference may be an effective intensity of incident light Vsig (that is, 15 in the example of FIG. 8). The counter 331 may output the effective intensity of incident light Vsig as the digital signal DS.

At a time t9, the timing controller 410 may provide the count enable signal CNT_EN having a logic low level to the reference voltage generation unit 200, and the reference voltage generation unit 200 may stop generating the reference voltage Vref.

A period from the time t7 to the time t9 corresponds to a maximum time for detecting the detected incident light Vrst+Vsig. A length of the period from the time t7 to the time t9 may be determined as a certain number of the count clock signal CLKC according to a characteristic of the image sensor 1000a.

At a time t10, the row driver 420 may provide a deactivated row selection signal SEL to the selected row of the pixel array 100, and the counter 331 may reset the counter output to zero.

The image sensor 1000a may repeat above described operations on each row to generate the digital signals DS row by row.

Figure 9:
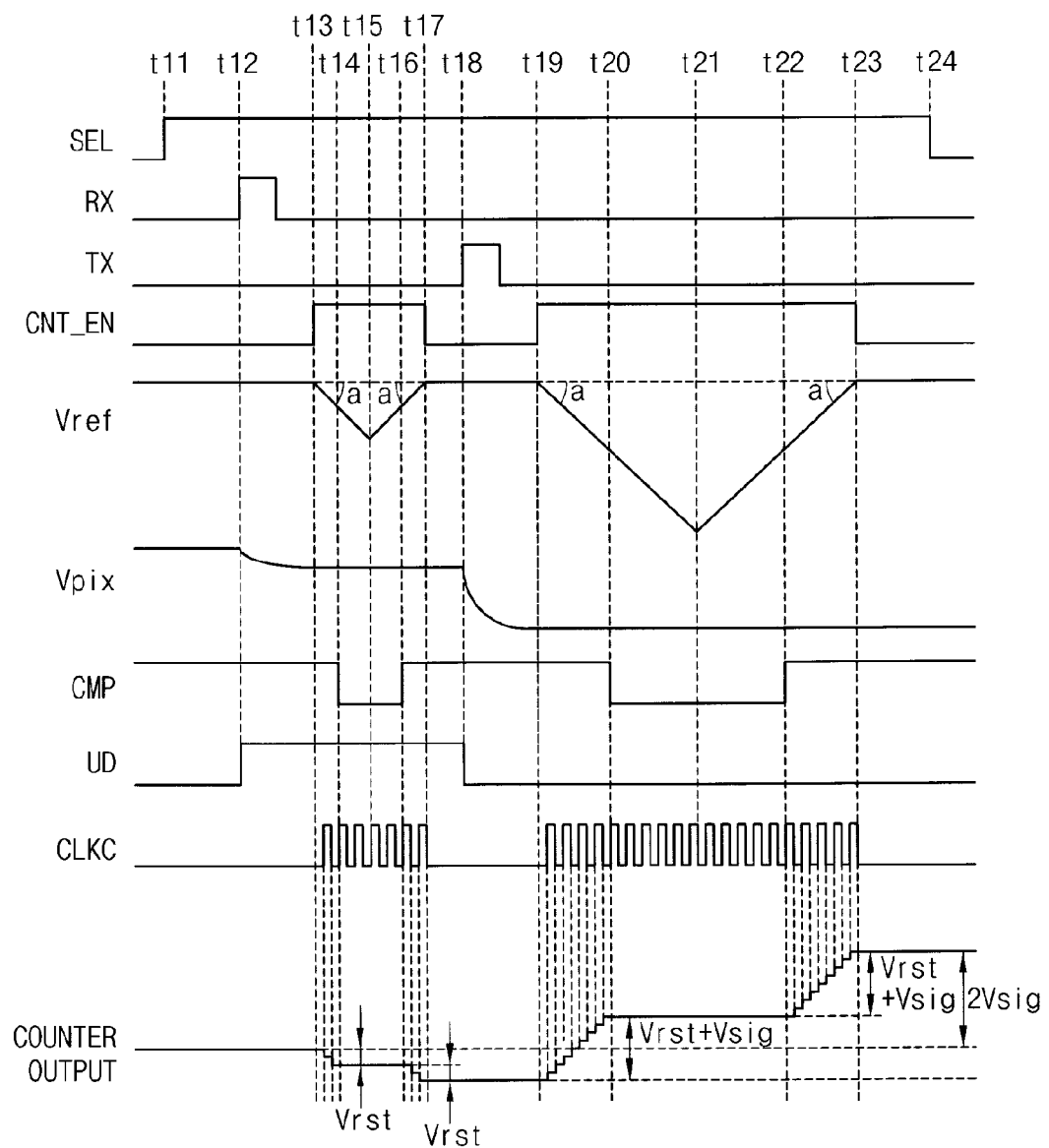
FIG. 9 is a timing diagram for describing an operation of an image sensor of FIG. 2 in a second operation mode.

FIG. 9 is a timing diagram for describing an operation of an image sensor of FIG. 2 in a second operation mode. In FIG. 9, an operation of the image sensor 1000a for one column of the pixel array 100 is illustrated. In FIG. 9, the pixel voltage Vpix is a signal that is outputted from the pixel array 100, and the value of the gain signal GN is two.

At a time t11, the row driver 420 may select one of rows included in the pixel array 100 by providing an activated row selection signal SEL to the selected row of the pixel array 100.

At a time t12, the row driver 420 may provide an activated reset control signal RX to the selected row, and the timing controller 410 may provide the up-down control signal UD having a logic high level to the counter 331. From the time t12, the pixel array 100 may output the first analog signal AS1 corresponding to the reset component Vrst as the pixel voltage Vpix.

At a time t13, the timing controller 410 may provide the count enable signal CNT_EN having a logic high level to the reference voltage generation unit 200, and the reference voltage generation unit 200 may start to decrease the reference voltage Vref at the constant rate, as in the first operation mode, that is a slope of 'a'. The comparator 311 may provide the comparison signal CMP having a logic high level to the counter 331 since the pixel voltage Vpix is smaller than the reference voltage Vref. The timing controller 410 may provide the count clock signal CLKC to the counter 331, and the counter 331 may perform the down-counting from zero in synchronization with the count clock signal CLKC.

At a time t14, the magnitude of the reference voltage Vref may become smaller than the magnitude of the pixel voltage Vpix, and the comparator 311 may provide the comparison signal CMP having a logic low level to the counter 331 so that the counter 331 stops performing the down-counting. At the time t14, the counter output of the counter 331 may correspond to the reset component Vrst. In an example of FIG. 9, the counter output of the counter 331 at the time t14 may be −2.

At a time t15, the reference voltage generation unit 200 may start to increase the reference voltage Vref at the constant rate as at the time t13, that is a slope of 'a'. The time t15 may be in the middle of the active period, in which the count enable signal CNT_EN is enabled. That is, the time t15 may be the middle of the time t13 and a time t17.

At a time t16, the magnitude of the reference voltage Vref may become larger than the magnitude of the pixel voltage Vpix, and the comparator 311 may provide the comparison signal CMP having a logic high level to the counter 331 so that the counter 331 starts again to perform the down-counting.

At a time t17, the timing controller 410 may provide the count enable signal CNT_EN having a logic low level to the reference voltage generation unit 200, and the reference voltage generation unit 200 may stop generating the reference voltage Vref. The timing controller 410 may stop toggling the count clock signal CLKC, and the counter 331 may stop performing the down-counting. At the time t17, the counter output of the counter 331 may be the first counting value that corresponds to twice of the reset component Vrst. In an example of FIG. 9, the counter output of the counter 331 at the time t17 may be −4.

A period from the time t13 to the time t15 and a period from the time t15 to the time t17 correspond to a maximum time for detecting the reset component Vrst. A length of the period from the time t13 to the time t15 and the period from the time t15 to the time t17 may be determined as a certain number of the count clock signal CLKC according to a characteristic of the image sensor 1000a.

At a time t18, the row driver 420 may provide an activated transmission control signal TX to the selected row, and the timing controller 410 may provide the up-down control signal UD having a logic low level to the counter 331. From the time t18, the pixel array 100 may output the second analog signal AS2 corresponding to the detected incident light Vrst+Vsig as the pixel voltage Vpix.

At a time t19, the timing controller 410 may provide the count enable signal CNT_EN having a logic high level to the reference voltage generation unit 200, and the reference voltage generation unit 200 may start to decrease the reference voltage Vref at the same constant rate as at the time t13, that is a slope of 'a'. The comparator 311 may provide the comparison signal CMP having a logic high level to the counter 331 since the pixel voltage Vpix is smaller than the reference voltage Vref. The timing controller 410 may provide the count clock signal CLKC to the counter 331, and the counter 331 may perform the up-counting from the first counting value, which corresponds to twice of the reset component Vrst, in synchronization with the count clock signal CLKC.

At a time t20, the magnitude of the reference voltage Vref may become smaller than the magnitude of the pixel voltage Vpix, and the comparator 311 may provide the comparison signal CMP having a logic low level to the counter 331 so that the counter 331 stops performing the up-counting.

At a time t21, the reference voltage generation unit 200 may start to increase the reference voltage Vref at the constant rate as at the time t19, that is a slope of 'a'. The time t21 may be in the middle of the active period, in which the count enable signal CNT_EN is enabled. That is, the time t21 may be the middle of the time t19 and a time t23.

At a time t22, the magnitude of the reference voltage Vref may become larger than the magnitude of the pixel voltage Vpix, and the comparator 311 may provide the comparison signal CMP having a logic high level to the counter 331 so that the counter 331 starts again to perform the up-counting.

At a time t23, the timing controller 410 may provide the count enable signal CNT_EN having a logic low level to the reference voltage generation unit 200, and the reference voltage generation unit 200 may stop generating the reference voltage Vref. The timing controller 410 may stop toggling the count clock signal CLKC, and the counter 331 may stop performing the up-counting. At the time t23, the counter output of the counter 331 may correspond to twice of a difference between the first analog signal AS1 representing the reset component Vrst (that is, −2 in the example of FIG. 9) and the second analog signal AS2 representing the detected incident light Vrst+Vsig (that is, 8 in the example of FIG. 9). The difference may be an effective intensity of incident light Vsig (that is, 6 in the example of FIG. 9). The counter 331 may output twice of the effective intensity of incident light (that is, 12 in the example of FIG. 9) as the digital signal DS.

A period from the time t19 to the time t21 and a period from the time t21 to the time t23 correspond to a maximum time for detecting the detected incident light Vrst+Vsig. A length of the period from the time t19 to the time t21 and the period from the time t21 to the time t23 may be determined as a certain number of the count clock signal CLKC according to a characteristic of the image sensor 1000a.

At a time t24, the row driver 420 may provide a deactivated row selection signal SEL to the selected row of the pixel array 100, and the counter 331 may reset the counter output to zero.

The image sensor 1000a may repeat above described operations on each row to generate the digital signals DS row by row.

The image sensor 1000a operates t a same speed both in the first operation mode and in the second operation mode to generate the digital signal DS. For example, a time required for the image sensor 1000a to generate the digital signals DS from the first analog signal AS1 and the second analog signal AS2 corresponding to a row of the pixel array 100 may be the same in the first operation mode and in the second operation mode. Therefore, a period from the time t1 to the time t10 during which the row selection signal SEL is activated in FIG. 8 is the same as a period from the time t11 to the time t24 during which the row selection signal SEL is activated in FIG. 9. In addition, a period from the time t3 to the time t5 during which the count enable signal CNT_EN is at a logic high level in FIG. 8 is the same as a period from the time t13 to the time t17 during which the count enable signal CNT_EN is at a logic high level in FIG. 9, and a period from the time t7 to the time t9 during which the count enable signal CNT_EN is at a logic high level in FIG. 8 is the same as a period from the time t19 to the time t23 during which the count enable signal CNT_EN is at a logic high level in FIG. 9.

When the digital signal DS is generated by accumulatively performing an analog-digital conversion on the first analog signal AS1 and the second analog signal AS2 N times in the second operation mode, the effective intensity of incident light included in the digital signal DS increases N times and a random noise included in the digital signal DS increases sqrt(N) times, where N is a positive number. Therefore, a signal-to-noise ratio (SNR) of the image sensor 1000a may be improved by sqrt(N) in the second operation mode.

As such, the image sensor according to the exemplary embodiments may have high sensitivity and high SNR without degrading the frame rate, even though an exposure time during which the image sensor detects incident light is relatively short.

The analog-digital conversion unit 300 of FIG. 2 may perform a binning operation on neighboring pixels of a same color in the second operation mode.

Figure 10:
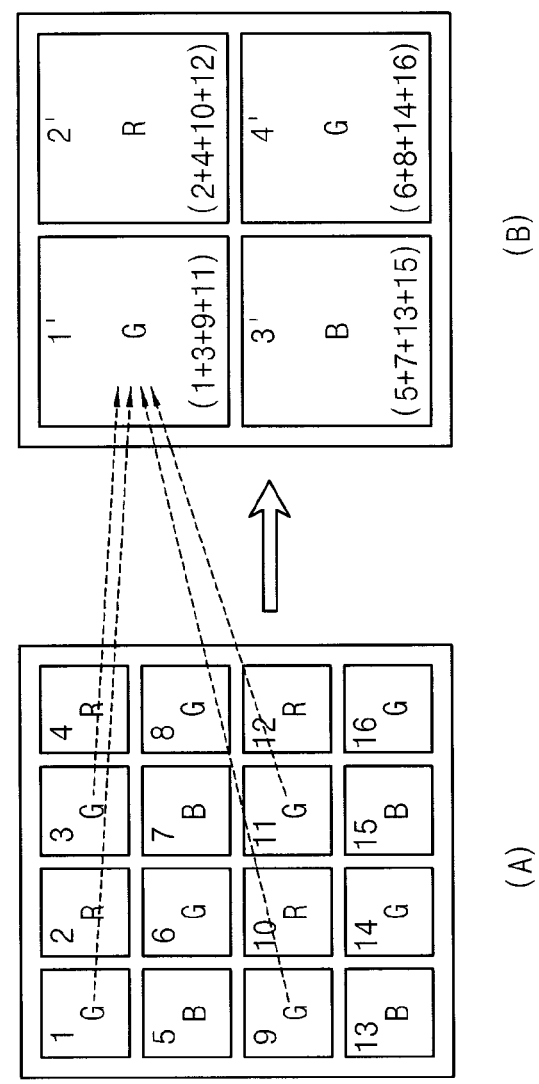
FIG. 10 is a diagram for describing a binning operation performed by the analog-digital conversion unit of FIG. 2.

FIG. 10 is a diagram for describing binning operation performed by the analog-digital conversion unit of FIG. 2.

In FIG. 10, a two-by-two (2*2) binning operation, which is performed on four neighboring pixels of a same color that are adjacent in a column direction and in a row direction of each other, is illustrated as an example.

As illustrated in FIG. 10, the pixel array 100 may have a bayer pattern A. Each number 1, 2, . . . , 16 in each pixel of bayer pattern A in FIG. 10 represents a pixel number.

The 2*2 binning operation may be performed by generating a binning digital signal (BDS) for each enlarged pixel by summing the digital signals DS corresponding to four neighboring pixels of a same color which are adjacent in column direction and in row direction each other. A bayer pattern B having a resolution decreased by four times and a pixel size increased by four times compared to the bayer pattern A may be generated by the 2*2 binning operation.

For example, as illustrated in FIG. 10, a binning digital signal BDS for a pixel 1' may be generated by summing the digital signals DS corresponding to four neighboring pixels 1, 3, 9, 11 of a green color, a binning digital signal BDS for a pixel 2' may be generated by summing the digital signals DS corresponding to four neighboring pixels 2, 4, 10, 12 of a red color, a binning digital signal BDS for a pixel 3' may be generated by summing the digital signals DS corresponding to four neighboring pixels 5, 7, 13, 15 of a blue color, and a binning digital signal BDS for a pixel 4' may be generated by summing the digital signals DS corresponding to four neighboring pixels 6, 8, 14, 16 of a green color.

Figure 11:
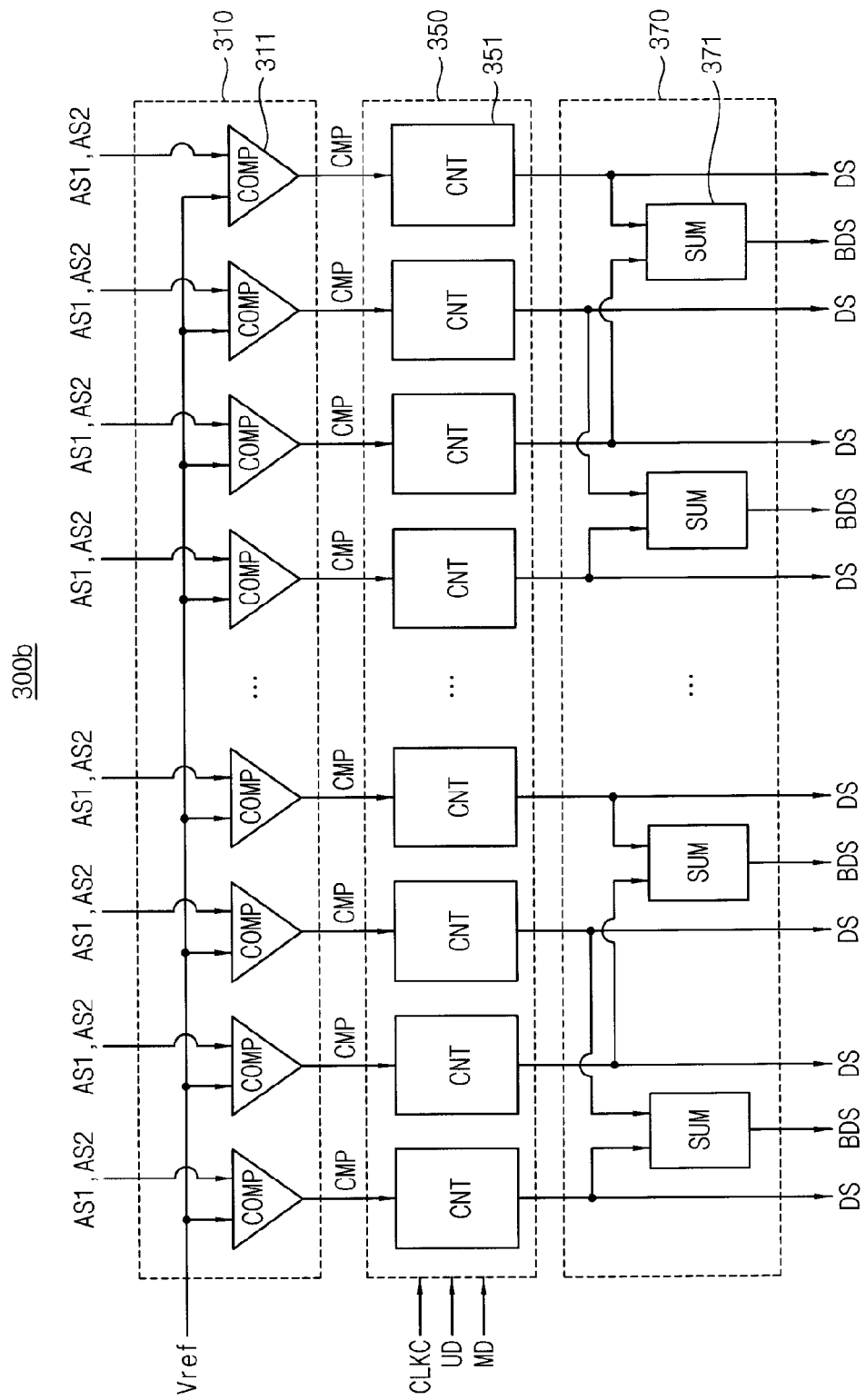
FIG. 11 is a block diagram illustrating another example of an analog-digital conversion unit of FIG. 2.

FIG. 11 is a block diagram illustrating another example of an analog-digital conversion unit of FIG. 2.

In FIG. 11, an analog-digital conversion unit 300b performs the 2*2 binning operation, which is described above with reference to FIG. 10, as an example.

Referring to FIG. 11, an analog-digital conversion unit 300b may include a comparison unit 310, a count unit 350, and an add unit 370.

A structure and an operation of the comparison unit 310 of FIG. 11 may be the same as the comparison unit 310 of FIG. 7. Therefore, a detail description of the comparison unit 310 of FIG. 11 will be omitted.

The count unit 350 may include a plurality of counters CNT 351, each of which is connected to a corresponding comparator 311 and receives the comparison signal CMP from the corresponding comparator 311. Each of the counters 351 may receive the mode signal MD, the count clock signal CLKC, and the up-down control signal UD from the timing controller 410 included in the control unit 400.

The counters 351 may operate in the first operation mode when the mode signal MD is at a first level. In the first operation mode, the control unit 400 may consecutively select rows of the pixel array 100 from an uppermost row of the pixel array 100 to a bottommost row of the pixel array 100. In the first operation mode, each of the counters 351 may generate the first counting value by performing the down-counting from zero when each of the counters 351 receives the first analog signal AS1 from the pixel array 100, and generate the second counting value by performing the up-counting from the first counting value when each of the counters 351 receives the second analog signal AS2 from the pixel array 100. Each of the counters 351 may output the second counting value as the digital signal DS and reset the second counting value before operating on a next row in the first operation mode.

The counters 351 may operate in the second operation mode when the mode signal MD is at a second level. In the second operation mode, the control unit 400 may consecutively select rows having pixels on which a binning operation is performed. For example, since four pixels on which the 2*2 binning operation is performed are located in a first row and a third row and four other pixels on which the 2*2 binning operation is performed are located in a second row and a fourth row in FIG. 10, the control unit 400 may select the first row and the third row consecutively at first, and then select the second row and the fourth row consecutively later. In the second operation mode, each of the counters 351 may generate the first counting value by accumulatively performing the down-counting the first number of times, which corresponds to a total number of decrease and increase of the reference voltage Vref, from zero when each of the counters 351 receives the first analog signal AS1 from the pixel array 100, and generate the second counting value by accumulatively performing the up-counting the first number of times from the first counting value when each of the counters 351 receives the second analog signal AS2 from the pixel array 100. Each of the counters 351 may not reset the second counting value, but may accumulatively perform the down-counting from the second counting value to generate the first counting value and accumulatively perform the up-counting from the first counting value to generate the second counting value for a next row having pixels on which binning operation is performed. In this manner, each of the counters 351 may accumulatively perform the down-counting and the up-counting for the rows having pixels on which the binning operation is performed, and then output the second counting value as the digital signal DS in the second operation mode. After outputting the digital signal DS, each of the counters 351 may reset the second counting value.

The add unit 370 may include a plurality of adders SUM 371. Each of the adders 371 may generate the binning digital signal BDS by summing the digital signals DS generated by counters 351 which correspond to pixels on which binning operation is performed in the second operation mode. For example, if the pixel array 100 has the bayer pattern A, a first adder 371 may generate the binning digital signal BDS by summing the digital signals DS generated by a counter 351 corresponding to a first column and a counter 351 corresponding to a third column, and a second adder 371 may generate the binning digital signal BDS by summing the digital signals DS generated by a counter 351 corresponding to a second column and a counter 351 corresponding to a fourth column, and so on. In this case, the column driver 430 included in the control unit 400 of FIG. 2 may consecutively output the digital signals DS received from the plurality of the counters 351 in the first operation mode and consecutively output the binning digital signals BDS received from the plurality of the adders 371 in the second operation mode. Although not illustrated in FIG. 2, the column driver 430 may provide the digital signals DS and the binning digital signals BDS to a digital signal processor.

Figure 12:
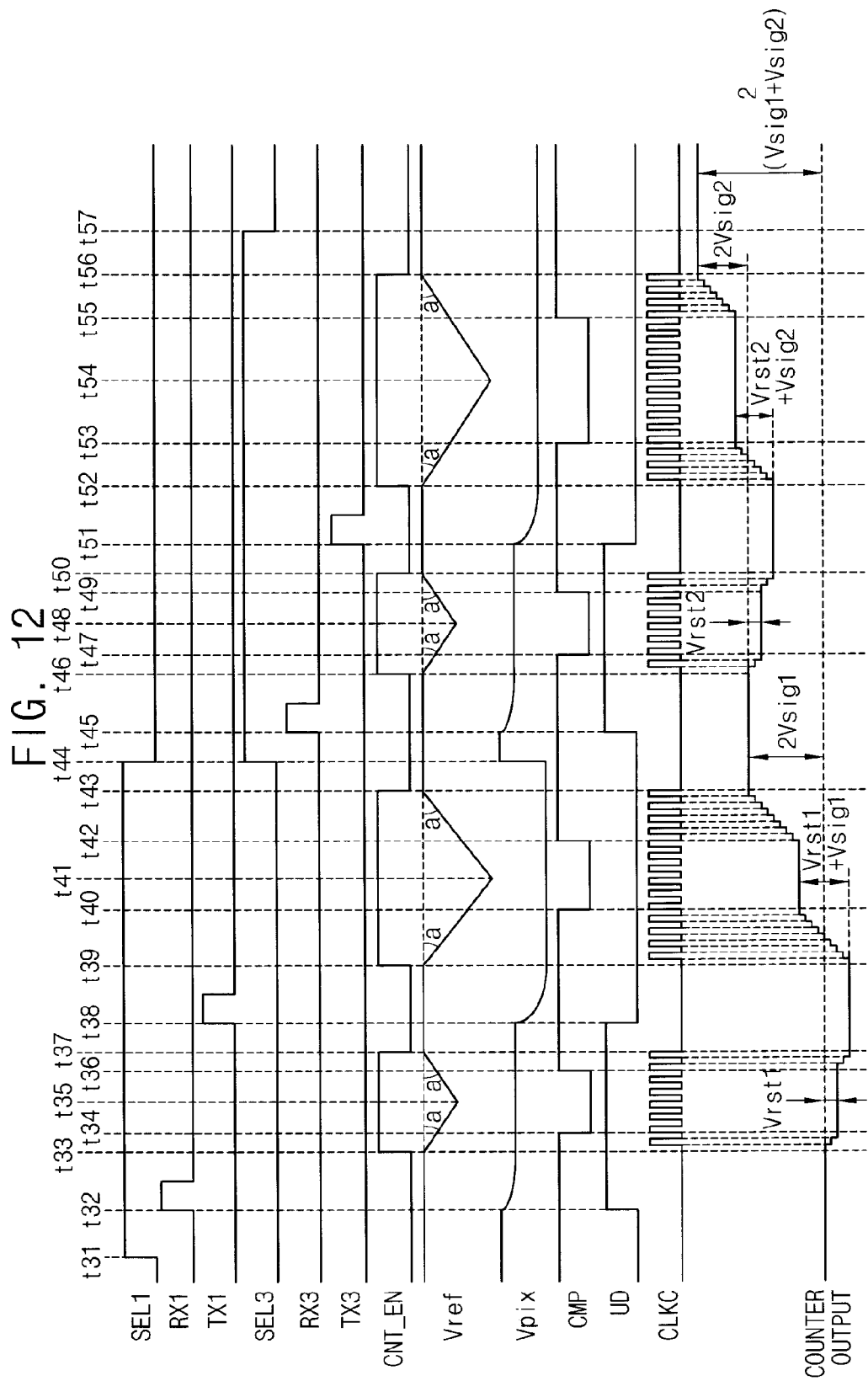
FIG. 12 is a timing diagram for describing an operation of an image sensor of FIG. 2 when the image sensor performs a binning operation in a second operation mode.

FIG. 12 is a timing diagram for describing an operation of an image sensor of FIG. 2 when the image sensor performs a binning operation in a second operation mode. In FIG. 12, an operation of the image sensor 1000a for one column of the pixel array 100 is illustrated. In FIG. 12, the pixel voltage Vpix is a signal that is outputted from the pixel array 100, and the value of the gain signal GN is two.

At a time t31, the row driver 420 may select a first row included in the pixel array 100 by providing an activated row selection signal SEL1 to the first row of the pixel array 100.

At a time t32, the row driver 420 may provide an activated reset control signal RX1 to the first row, and the timing controller 410 may provide the up-down control signal UD having a logic high level to the counter 351. From the time t32, the pixel array 100 may output the first analog signal AS1 corresponding to a first reset component Vrst1 as the pixel voltage Vpix.

At a time t33, the timing controller 410 may provide the count enable signal CNT_EN having a logic high level to the reference voltage generation unit 200, and the reference voltage generation unit 200 may start to decrease the reference voltage Vref at the constant rate as in the first operation mode, that is a slope of 'a'. The comparator 311 may provide the comparison signal CMP having a logic high level to the counter 351 since the pixel voltage Vpix is smaller than the reference voltage Vref. The timing controller 410 may provide the count clock signal CLKC to the counter 351, and the counter 351 may perform the down-counting from zero in synchronization with the count clock signal CLKC.

At a time t34, the magnitude of the reference voltage Vref may become smaller than the magnitude of the pixel voltage Vpix, and the comparator 311 may provide the comparison signal CMP having a logic low level to the counter 351 so that the counter 351 stops performing the down-counting. At the time t34, the counter output of the counter 351 may correspond to the first reset component Vrst1. In an example of FIG. 12, the counter output of the counter 351 at the time t34 may be −2.

At a time t35, the reference voltage generation unit 200 may start to increase the reference voltage Vref at the constant rate as at the time t33, that is a slope of 'a'. The time t35 may be in the middle of the active period, in which the count enable signal CNT_EN is enabled. That is, the time t35 may be the middle of the time t33 and a time t37.

At a time t36, the magnitude of the reference voltage Vref may become larger than the magnitude of the pixel voltage Vpix, and the comparator 311 may provide the comparison signal CMP having a logic high level to the counter 351 so that the counter 351 starts again to perform the down-counting.

At a time t37, the timing controller 410 may provide the count enable signal CNT_EN having a logic low level to the reference voltage generation unit 200, and the reference voltage generation unit 200 may stop generating the reference voltage Vref. The timing controller 410 may stop toggling the count clock signal CLKC, and the counter 351 may stop performing the down-counting. At the time t37, the counter output of the counter 351 may be the first counting value that corresponds to twice of the first reset component Vrst1. In an example of FIG. 12, the counter output of the counter 351 at the time t37 may be −4.

A period from the time t33 to the time t35 and a period from the time t35 to the time t37 correspond to a maximum time for detecting the first reset component Vrst1. A length of the period from the time t33 to the time t35 and the period from the time t35 to the time t37 may be determined as a certain number of the count clock signal CLKC according to a characteristic of the image sensor 1000a.

At a time t38, the row driver 420 may provide an activated transmission control signal TX1 to the first row, and the timing controller 410 may provide the up-down control signal UD having a logic low level to the counter 351. From the time t38, the pixel array 100 may output the second analog signal AS2 corresponding to a first detected incident light Vrst1+Vsig1 as the pixel voltage Vpix.

At a time t39, the timing controller 410 may provide the count enable signal CNT_EN having a logic high level to the reference voltage generation unit 200, and the reference voltage generation unit 200 may start to decrease the reference voltage Vref in the same constant rate as at the time t33, that is a slope of 'a'. The comparator 311 may provide the comparison signal CMP having a logic high level to the counter 351 since the pixel voltage Vpix is smaller than the reference voltage Vref. The timing controller 410 may provide the count clock signal CLKC to the counter 351, and the counter 351 may perform the up-counting from the first counting value, which corresponds to twice of the first reset component Vrst1, in synchronization with the count clock signal CLKC.

At a time t40, the magnitude of the reference voltage Vref may become smaller than the magnitude of the pixel voltage Vpix, and the comparator 311 may provide the comparison signal CMP having a logic low level to the counter 351 so that the counter 351 stops performing the up-counting.

At a time t41, the reference voltage generation unit 200 may start to increase the reference voltage Vref at the constant rate as at the time t39, that is a slope of 'a'. The time t41 may be in the middle of the active period, in which the count enable signal CNT_EN is enabled. That is, the time t41 may be the middle of the time t39 and a time t43.

At a time t42, the magnitude of the reference voltage Vref may become larger than the magnitude of the pixel voltage Vpix, and the comparator 311 may provide the comparison signal CMP having a logic high level to the counter 351 so that the counter 351 starts again to perform the up-counting.

At a time t43, the timing controller 410 may provide the count enable signal CNT_EN having a logic low level to the reference voltage generation unit 200, and the reference voltage generation unit 200 may stop generating the reference voltage Vref. The timing controller 410 may stop toggling the count clock signal CLKC, and the counter 351 may stop performing the up-counting. At the time t43, the counter output of the counter 351 may correspond to twice of a difference between the first analog signal AS1 representing the first reset component Vrst1 (that is, −2 in the example of FIG. 12) and the second analog signal AS2 representing the first detected incident light Vrst1+Vsig1 (that is, 8 in the example of FIG. 12). The difference may be a first effective intensity of incident light Vsig1 (that is, 6 in the example of FIG. 12).

A period from the time t39 to the time t41 and a period from the time t41 to the time t43 correspond to a maximum time for detecting the first detected incident light Vrst1+Vsig1. A length of the period from the time t39 to the time t41 and the period from the time t41 to the time t43 may be determined as a certain number of the count clock signal CLKC according to a characteristic of the image sensor 1000a.

At a time t44, the row driver 420 may provide a deactivated row selection signal SEL1 to the first row of the pixel array 100, and select a third row included in the pixel array 100 by providing an activated row selection signal SEL3 to the third row of the pixel array 100. At this time, the counter 351 may not reset the counter output but maintain the counter output.

The image sensor 1000a may perform the same operations from the time t44 to a time t57 as the operations performed from the time t31 to the time t44, and thus a detailed description of the operation and is omitted.

At the time t57, the counter output of the counter 351 may correspond to a sum of twice of the first effective intensity of incident light Vsig1 (that is, 6 in the example of FIG. 12) and twice of a second effective intensity of incident light Vsig2 (that is, 4 in the example of FIG. 12). The counter 351 may output the sum of twice of the first effective intensity of incident light Vsig1 and twice of the second effective intensity of incident light Vsig2 (that is, 20 in the example of FIG. 12) as the digital signal DS.

After that, as illustrated in FIG. 11, each of the adders 371 may generate the binning digital signal BDS by summing the digital signals DS generated by counters 351 which correspond to pixels on which binning operation is performed in the second operation mode.

When the binning digital signal BDS is generated by performing binning operation in the second operation mode, photon shot noise and fixed pattern noise included in the binning digital signal BDS may be reduces since photon shot noise and fixed pattern noise are spatially averaged. Therefore, the image sensor according to the exemplary embodiments may reduce total noise included in the binning digital signal BDS.

Figure 13:
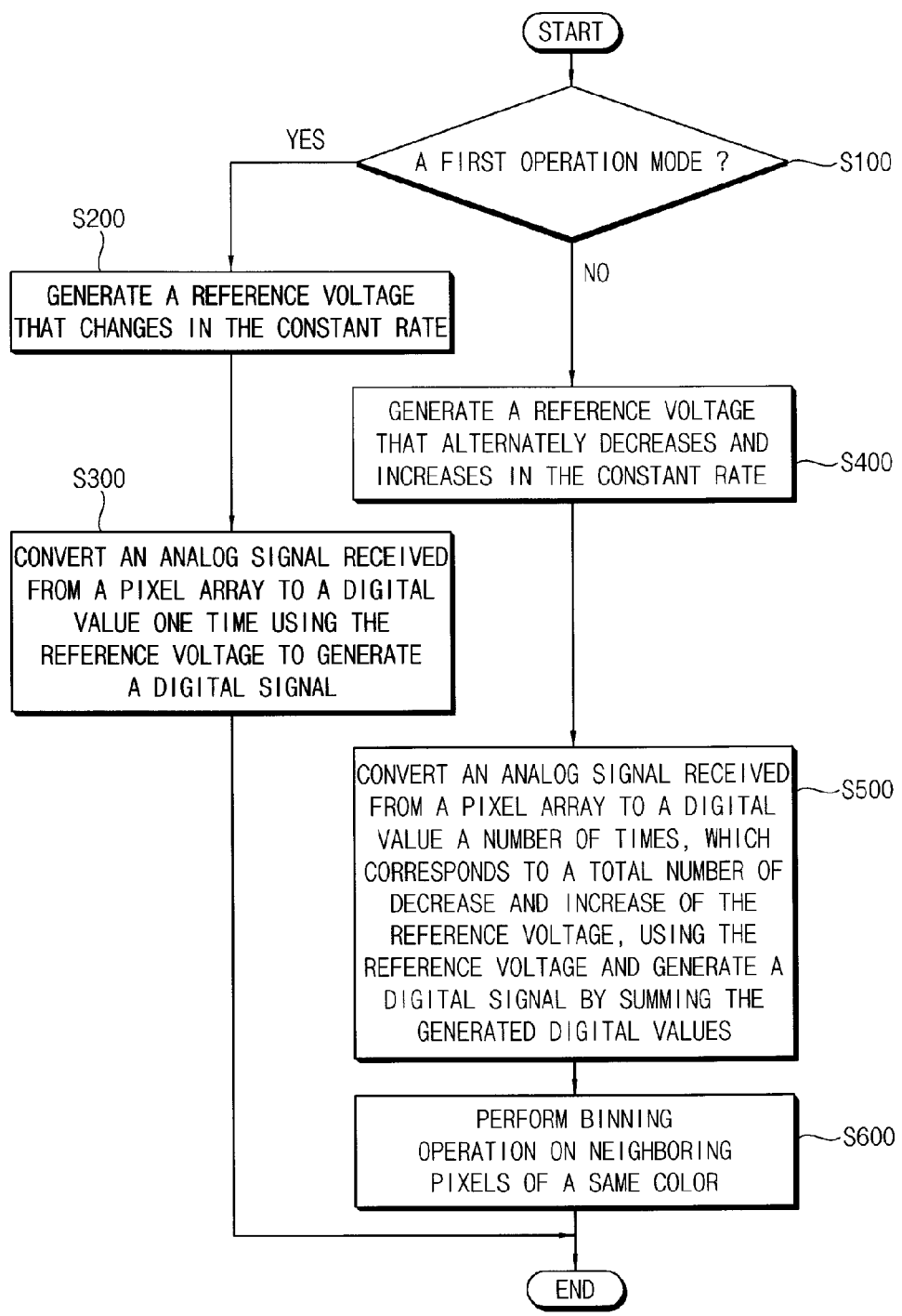
FIG. 13 is a flow chart illustrating an operation of an image sensor of FIG. 1.

FIG. 13 is a flow chart illustrating an operation of an image sensor of FIG. 1.

Referring to FIG. 13, the reference voltage generation unit 200 determines an operation mode based on the second control signal CON2 received from the control unit 400 (step S100).

The reference voltage generation unit 200 generates the reference voltage Vref that changes at the constant rate in the first operation mode (step S200). The analog-digital conversion unit 300 converts the analog signal AS received from the pixel array 100 to a digital value one time using the reference voltage Vref and outputs the digital value as the digital signal DS in the first operation mode (step S300).

The reference voltage generation unit 200 generates the reference voltage Vref that alternately decreases and increases at the same constant rate in the second operation mode (step S400). The analog-digital conversion unit 300 converts the analog signal AS to a digital value the first number of times, which corresponds to a total number of decrease and increase of the reference voltage Vref, using the reference voltage Vref and generates the digital signal DS by summing the generated digital values in the second operation mode (step S500).

The analog-digital conversion unit 300 may perform a binning operation on neighboring pixels of a same color in the second operation mode (step S600).

The operation of the image sensor is described above with reference to FIGS. 1 to 12. Therefore, a detail description of each step of FIG. 13 will be omitted.

Figure 14:
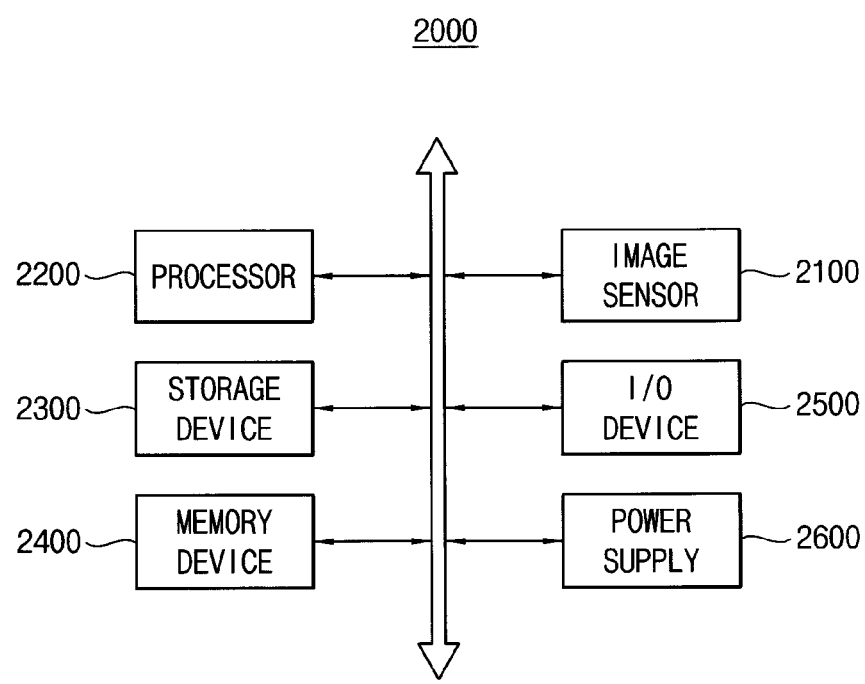
FIG. 14 is a block diagram illustrating a camera system according to an exemplary embodiment.

FIG. 14 is a block diagram illustrating a camera system according to example embodiments.

Referring to FIG. 14, a camera system 2000 includes an image sensor 2100, a processor 2200, and a storage device 2300.

The image sensor 2100 generates a digital signal corresponding to incident light. The storage device 2300 stores the digital signal generated by the image sensor 2100. The processor 2200 controls operations of the image sensor 2100 and the storage device 2300.

The camera system 2000 may further include a memory device 2400, an input/output (I/O) device 2500 and a power supply 2600. Although not illustrated in FIG. 14, the camera system 2000 may further include one or more interfaces to communicate with a video card, a sound card, a memory card, a universal serial bus (USB) device, etc.

The processor 2200 may perform various computing functions, such as executing specific software for performing specific calculations or tasks. For example, the processor 2200 may be a microprocessor or a central processing unit (CPU). The processor 2200 may be connected to the storage device 2300, the memory device 2400 and the input/output device 2500 via a bus, such as an address bus, a control bus or a data bus, etc. The processor 2200 may be connected to an extended bus, such as peripheral component interconnect (PCI) bus. The processor 2200 may execute computer-readable program codes for executing the specific software or for performing the specific calculations or tasks. The computer-readable program codes may be stored in the storage device 2300 or memory device 2400, or received through one or more interfaces.

The storage device 2300 may be one or more of a solid state drive, a hard disk drive, a compact disk read-only memory (CD-ROM) drive, etc.

The memory device 2400 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 2500 may include a keyboard, a mouse, a printer, a display device, etc. for receiving input from a user or other source and providing output to the user or another source. The power supply 2600 may supply operational power to the camera system 2000.

The image sensor 2100 communicates with the processor 2200 via a bus. The image sensor 2100 includes a pixel array, a reference voltage generation unit, an analog-digital conversion unit and a control unit.

The pixel array includes a plurality of pixels arranged columns and rows. Each of the pixels detects incident light and generates an analog signal in response to the detected incident light.

The reference voltage generation unit generates a reference voltage Vref that changes at a constant rate in a first operation mode, and generates the reference voltage Vref that alternately decreases and increases at the constant rate in a second operation mode.

The analog-digital conversion unit converts the analog signal to a digital value a first number of times using the reference voltage and generates the digital signal by summing the first number of the digital values. The first number corresponds to a total number of decrease and increase of the reference voltage. The analog-digital conversion unit operates at a same speed both in the first operation mode and in the second operation mode to generate the digital signal.

The control unit controls operations of the pixel array, the reference voltage generation unit, and the analog-digital conversion unit. The control unit may be a processor or other programmable hardware element for executing instructions to control the operations of the pixel array, the reference voltage generation unit, and the analog-digital conversion unit.

In some exemplary embodiments, the analog-digital conversion unit may perform binning operation on neighboring pixels of a same color in the second operation mode.

The image sensor 2100 may be embodied with the image sensor 1000 of FIG. 1. A structure and an operation of the image sensor 1000 of FIG. 1 are described above with reference to FIGS. 1 to 13. Therefore, a detail description of the image sensor 2100 of FIG. 14 will be omitted.

In some exemplary embodiments, the image sensor 2100 may be integrated in a chip with the processor 2200. In other embodiments, the image sensor 2100 and the processor 2200 may be integrated in separate chips. The camera system 2000 may be arbitrary systems that include the image sensor 2100, such as a digital camera, a camcorder, etc.

The foregoing exemplary embodiments are illustrative of the scope of the disclosure and are not to be construed as limiting thereof. Although a few exemplary embodiments have been described, those skilled in the art will readily appreciate that many modifications are possible to the exemplary embodiments without materially departing from the teachings of the disclosure. Accordingly, all such modifications are intended to be included within the scope of the present disclosure. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the disclosure.

What is claimed is:

1. An image sensor, comprising:
a pixel array comprising a plurality of pixels arranged in columns and rows, one of the plurality of pixels detecting incident light and generating an analog signal in response to the detected incident light;
a reference voltage generation unit configured to generate a reference voltage that changes at a constant rate in a first operation mode and that alternately decreases and increases at the constant rate in a second operation mode;
an analog-digital conversion unit configured to convert the analog signal to a digital value a first number of times to generate a first number of digital values using the reference voltage and generate a digital signal by summing the first number of the digital values, the first number corresponding to a total number of decreases and increases of the reference voltage, the analog-digital conversion unit operating at a same speed in the first operation mode and the second operation mode to generate the digital signal; and a control unit configured to control operations of the pixel array, the reference voltage generation unit, and the analog-digital conversion unit.

2. The image sensor of claim 1, wherein the first operation mode is a still image capturing mode and the second operation mode is a video recording mode.

3. The image sensor of claim 1, wherein the reference voltage generation unit receives a mode signal, a gain signal, and a count enable signal from the control unit, generates the reference voltage that decreases at the constant rate during an active period, in which the count enable signal is enabled, when the mode signal is at a first level corresponding to the first operation mode, and generates the reference voltage that alternately decreases and increases at the constant rate in a cycle of a sub period, which is a portion of the active period divided by a value of the gain signal, when the mode signal is at a second level corresponding to the second operation mode.

4. The image sensor of claim 1, wherein the reference voltage generation unit includes:

a resistor connected to a supply voltage; and a current generation unit coupled between the resistor and a ground voltage, the current generation unit receiving a mode signal, a gain signal and a count enable signal from the control unit, the current generation unit generating a reference current that increases at the constant rate during an active period, in which the count enable signal is enabled, when the mode signal is at a first level corresponding to the first operation mode, the current generation unit generating the reference current that alternately increases and decreases at the constant rate in a cycle of a sub period, which is a portion of the active period divided by a value of the gain signal, when the mode signal is at a second level corresponding to the second operation mode, wherein the reference current flows from the resistor to the ground voltage, and wherein the reference voltage generation unit outputs the reference voltage from a node at which the resistor and the current generation unit are coupled.

5. The image sensor of claim 1, wherein the one of the plurality of the pixels generates a first analog signal corresponding to a reset component and a second analog signal corresponding to the detected incident light, and wherein the analog-digital conversion unit generates the digital signal corresponding to an effective intensity of incident light among the detected incident light by performing a correlated double sampling (CDS) operation on the first analog signal and the second analog signal.

6. The image sensor of claim 5, wherein the analog-digital conversion unit includes:

a plurality of comparators, the plurality of comparators being respectively connected to a corresponding column of the pixel array, the plurality of comparators generating a comparison signal by comparing the first analog signal with the reference voltage and comparing the second analog signal with the reference voltage; and a plurality of counters, the plurality of counters being respectively connected to a corresponding comparator of the plurality of comparators and receiving the comparison signal from the corresponding comparator, the plurality of counters receiving a count clock signal and an up-down control signal from the control unit, the plurality of counters generating the digital signal by performing one of a down-counting and an up-counting in response to the up-down control signal in synchronization with the count clock signal while the comparison signal is enabled.

7. The image sensor of claim 6, wherein the control unit provides the plurality of the counters with the count clock signal having a same frequency in the first operation mode and in the second operation mode.

8. The image sensor of claim 6, wherein one of the plurality of counters generates a first counting value by accumulatively performing the down-counting the first number of times from zero when the one of the plurality of counters receives the first analog signal from the pixel array, and generates a second counting value by accumulatively performing the up-counting the first number of times from the first counting value when the one of the plurality of counters receives the second analog signal from the pixel array, and wherein the one of the plurality of counters outputs the second counting value as the digital signal.

9. The image sensor of claim 6, wherein the analog-digital conversion unit performs a binning operation on neighboring pixels of a same color in the second operation mode.

10. The image sensor of claim 9, wherein the analog-digital conversion unit performs a two-by-two binning operation on four neighboring pixels of the same color that are adjacent in a column direction and in a row direction of each other in the second operation mode.

11. The image sensor of claim 9, wherein the control unit consecutively selects rows, which are included in the pixel array, having pixels on which the binning operation is performed in the second operation mode.

12. The image sensor of claim 11, wherein the plurality of counters accumulatively performs the down-counting and the up-counting for the rows having pixels on which the binning operation is performed in the second operation mode.

13. The image sensor of claim 12, wherein the analog-digital conversion unit further includes a plurality of adders that generates a binning digital signal by summing the digital signals generated by counters which correspond to pixels on which binning operation is performed in the second operation mode.

14. The image sensor of claim 13, wherein the control unit includes a column driver that consecutively outputs the digital signals received from the plurality of the counters in the first operation mode and consecutively outputs the binning digital signals received from the plurality of the adders in the second operation mode.

15. The image sensor of claim 1, wherein the total number of increases and decreases of the reference voltage is a total number of changes of a rate of change of the reference voltage.

16. A camera system, comprising:

an image sensor configured to generate a digital signal corresponding to incident light;

a storage unit configured to store the digital signal; and a processor configured to control operations of the image sensor and the storage unit, wherein the image sensor comprises:

a pixel array comprising a plurality of pixels arranged in columns and rows, one of the plurality of pixels detecting incident light and generating an analog signal in response to the detected incident light;

a reference voltage generation unit configured to generate a reference voltage that changes at a constant rate in a first operation mode and that alternately decreases and increases at the constant rate in a second operation mode;
an analog-digital conversion unit configured to convert the analog signal to a digital value a first number of times to generate a first number of digital values using the reference voltage and generate the digital signal by summing the first number of the digital values, the first number corresponding to a total number of decreases and increases of the reference voltage, the analog-digital conversion unit operating at a same speed in the first operation mode and the second operation mode to generate the digital signal; and
a control unit configured to control operations of the pixel array, the reference voltage generation unit and the analog-digital conversion unit.

* * * * *